United States Patent
Kong et al.

(10) Patent No.: US 7,218,248 B2
(45) Date of Patent: May 15, 2007

(54) INPUT MODE SWITCHING SYSTEM

(75) Inventors: Yuan Kong, Kirkland, WA (US); Pawin Suthapong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 194 days.

(21) Appl. No.: 11/132,012

(22) Filed: May 18, 2005

(65) Prior Publication Data

US 2006/0261982 A1    Nov. 23, 2006

(51) Int. Cl.
*H03M 11/00*    (2006.01)
(52) U.S. Cl. .................. 341/22; 705/145; 345/168; 345/169
(58) Field of Classification Search ........... 341/20, 341/22; 345/168, 169; 708/145
See application file for complete search history.

(56) References Cited

U.S. PATENT DOCUMENTS

| | | | |
|---|---|---|---|
| 3,955,074 A * | 5/1976 | Rode et al. ............ | 708/145 |
| 4,202,038 A * | 5/1980 | Petersson ............ | 708/145 |
| 5,530,455 A | 6/1996 | Gillick et al. | |
| 5,912,661 A | 6/1999 | Siddiqui | |
| 6,075,518 A | 6/2000 | Pruchniak | |
| 6,097,371 A | 8/2000 | Siddiqui et al. | |
| 6,128,006 A | 10/2000 | Rosenberg et al. | |
| 6,130,628 A * | 10/2000 | Schneider-Hufschmidt et al. ............ | 341/26 |
| 6,172,354 B1 | 1/2001 | Adan et al. | |
| 6,281,881 B1 | 8/2001 | Siddiqui et al. | |
| 6,353,429 B1 | 3/2002 | Long | |
| 6,380,927 B1 | 4/2002 | Ostrum et al. | |

\* cited by examiner

*Primary Examiner*—Albert K. Wong
(74) *Attorney, Agent, or Firm*—Banner & Witcoff, Ltd.

(57) ABSTRACT

A system and method for switching input modes is disclosed that includes receiving an input signal from an input device and determining whether the input signal is a data signal or a command signal. A present value of a counter is also determined if the input signal is a data signal. If the present value of the counter is not greater than zero, an output signal having a first value type is produced. If the present value of the counter is greater than zero, then the present value of the counter is decremented and an output signal having a second value type is produced. Additional aspects of the present invention relate to input devices utilized in switching between the input modes.

19 Claims, 5 Drawing Sheets

INPUT MODE SWITCHING SYSTEM

FIELD OF THE INVENTION

Aspects of the invention generally relate to systems, methods, and computer-readable media with computer-executable instructions stored thereon for switching between input modes in a computing environment. Additional aspects of the invention relate to input devices utilized in switching between the input modes.

BACKGROUND

A variety of data entry techniques have been developed to enhance usability and to make computers more versatile throughout the evolution of the field of computer science. A typical computing environment, especially a computing environment incorporating graphical user interfaces for user interaction, may be optimized for accepting input from one or more discrete input devices. As an example, an individual may enter characters (i.e., text, numerals, and symbols) with a keyboard and control the position of a pointer image on a display screen with a pointing device, such as a mouse or trackball. Some computing environments even incorporate a pen-like stylus that may be utilized to enter characters and serve the general purpose of the pointing device.

Numerous software applications have been developed that permit an individual to form data files by entering characters with a keyboard or other input device. As utilized herein, the term character is intended to encompass a symbol or other figure that may be entered by the individual. Examples of characters include alphabetic characters from any of the Roman, Cyrillic, Arabic, Hebrew, or Greek alphabets, for example. Furthermore, a character may be a numeral, a punctuation mark, or one of the various symbols that are commonly utilized in written text, such as $, #, %, &, or @, for example. In addition, a character may be one of the various symbols utilized in Asian languages, such as the Chinese, Japanese, and Korean languages.

Although conventional character entry with a keyboard is generally considered to be a convenient and expedient process, numerous steps may be necessary to switch between various input modes. For example, an individual may wish to switch from a first input mode where a series of lowercase alphabetic characters are entered to a second input mode where a series of uppercase alphabetic characters are entered. One manner of switching from the first input mode to the second input mode involves activating and holding a "Shift" key while various character keys are activated in sequence. Following entry of the uppercase alphabetic characters, the individual releases the "Shift" key to return to the first input mode and enter lowercase alphabetic characters. Another manner of switching from the first input mode to the second input mode involves activating a "Caps Lock" key and subsequently activating the various character keys in sequence. Following entry of the uppercase alphabetic characters, the individual again activates the "Caps Lock" key to return to the first input mode and enter lowercase alphabetic characters. Accordingly, multiple steps are utilized to transition from the first input mode to the second input mode, and again return to the first input mode.

Another example of a situation where an individual may wish to switch from a first input mode to a second input mode relates to the use of a pointing device to move a pointer image on a display screen. One or more data files, such as a text document, digital photograph, spreadsheet, or Web page, for example, are commonly rendered on display screens. In order to modify the data files or move between data files that are rendered on the display screen, the pointing device is utilized to move and activate the pointer image. In general, the individual configures the pointing device to move the pointer image at the highest velocity that also permits the pointer image to be accurately placed in a desired location on the display screen. In some circumstances, however, the individual may wish to increase the velocity of the pointer image in order to move the pointer image a greater distance, or the individual may wish to decrease the velocity of the pointer image in order to move the pointer image with greater accuracy. Additionally, the individual may wish to utilize the pointing device to scroll the data file or move the pointer image from one display screen to another display screen when multiple display screens are utilized. Accordingly, situations may arise where the individual wishes to switch from a first input mode (i.e., wherein the pointer image moves at a first velocity) to a second input mode (i.e., wherein the pointer image moves at a second velocity, the data file scrolls, or the pointer image moves between display screens).

SUMMARY

One aspect of the invention is a method of producing an output signal. The method includes receiving an input signal from an input device and determining whether the input signal is a data signal or a command signal. A present value of a counter is also determined if the input signal is a data signal. If the present value of the counter is not greater than zero, an output signal having a first value type is produced. If the present value of the counter is greater than zero, then the present value of the counter is decremented and an output signal having a second value type is produced.

Another aspect of the invention is user input interface tool having a counter and an output module. The output module receives a data signal from an input device and determines whether a present value of the counter is greater than zero. If the present value of the counter is not greater than zero, an output signal having a first value type is produced. If the present value of the counter is greater than zero, the present value of the counter is decremented and an output signal having a second value type is produced.

Yet another aspect of the invention is an input device having a housing, a first actuator, and a second actuator. The housing forms at least a portion of an exterior of the input device. The first actuator is accessible from the exterior of the input device, and the first actuator produces a first input signal. The second actuator includes a pressure sensor, and the second actuator produces a second input signal having a value that varies in proportion to a degree of pressure exerted upon the second actuator.

The advantages and features of novelty characterizing the invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary, as well as the following Detailed Description, will be better understood when read in conjunction with the accompanying drawings.

DETAILED DESCRIPTION

Introduction

The following discussion and accompanying figures disclose systems, methods, and computer-readable media with computer-executable instructions stored thereon for switching between input modes in a computing environment. The following discussion and accompanying figures also disclose input devices utilized in switching between input modes.

When entering alphabetic characters to form text, for example, an individual generally activates a series of character keys associated with a keyboard. In many circumstances, a majority of the alphabetic characters entered are lowercase. At a beginning of a sentence, however, capitalized or uppercase alphabetic characters may be utilized. This may be accomplished by simultaneously activating a "Shift" key and a character key. When a series of uppercase alphabetic characters are entered, three general steps are utilized: (a) a "Caps Lock" key is activated to switch the input mode from lowercase alphabetic characters to uppercase alphabetic characters, (b) a series of character keys are activated to form the series of uppercase alphabetic characters, and (c) the "Caps Lock" key is activated again to switch the input mode from uppercase alphabetic characters to lowercase alphabetic characters. In this scenario, therefore, the "Caps Lock" key is activated on two occasions to switch between input modes. A similar scenario is utilized when utilizing a "Number Lock" key to switch between input modes associated with a number pad, for example.

Pointing devices, such as a mouse or trackball, are also be utilized to switch between input modes that include a pointing mode and a scroll mode. In general, a pointing device is utilized in the pointing mode when a pointer image is moved relative to a data file rendered on a display screen. The individual may also utilize the pointing device in the scroll mode to scroll the data file relative the display screen. In order to switch from the pointing mode to the scroll mode, an actuator on the pointing device is activated. Return to the pointing mode is then accomplished by again activating the actuator. In this scenario, therefore, the actuator is activated on two occasions to switch between input modes. A similar scenario is utilized when utilizing the pointing device to enter other input modes. For example, a different input mode may be utilized to navigate among multiple display screens or to different portions of a relatively large display screen. Different input modes may also be utilized to increase or decrease a velocity of the pointer image. That is, a first input mode may be utilized to move the pointer at a first velocity relative the display screen, and a second input mode may be utilized to move the pointer at a second velocity. In each of these scenarios, however, an actuator or other input is utilized on two occasions to switch between input modes.

Aspects of the invention decrease the number of steps utilized to switch between input modes. As will be described in greater detail below, the individual may switch from a first input mode to a second input mode. Once a specified number of inputs are received in the second input mode, the system returns to the first input mode without additional input from the individual. As an alternative, the system may return to the first input mode once a specified amount of time expires. Furthermore, aspects of the invention involve switching between input modes through use of a pressure sensor that is incorporated into an input device.

Illustrative Computing Environment

Figure 1:
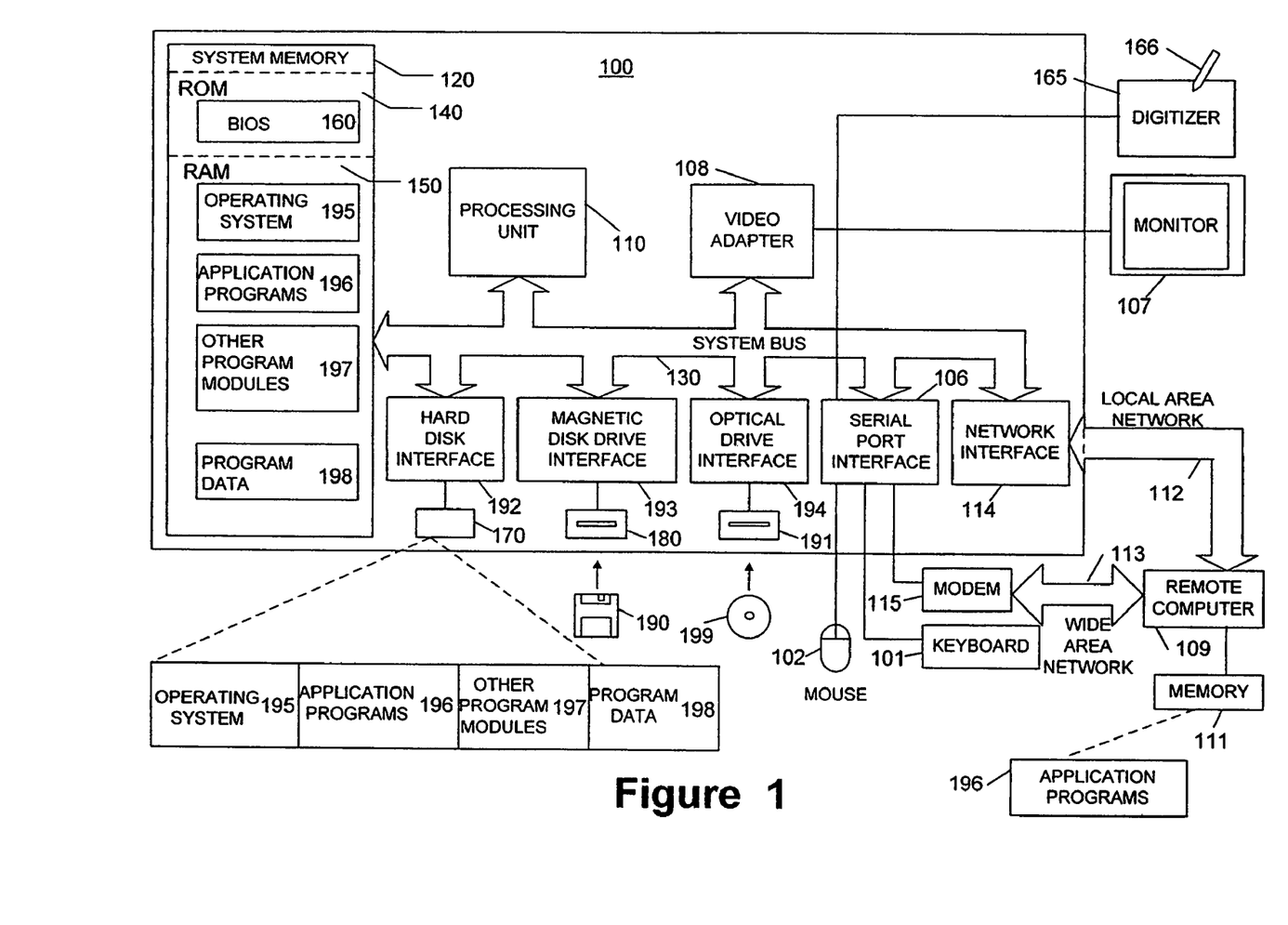
FIG. 1 is a schematic diagram of a general-purpose digital computer operating environment in which various aspects of the invention may be implemented.

FIG. 1 illustrates a schematic diagram of a general-purpose digital computing environment that can be used to implement various aspects of the invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, the magnetic disk drive 180, and the optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, the magnetic disk 190, the optical disk 199, the ROM 140, or the RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input.

Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used.

The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows an illustrative environment, it will be understood that other computing environments also may be used. For example, one or more examples of the invention may use an environment having fewer than all of the various aspects shown in FIG. 1 and described above, and these aspects may appear in various combinations and subcombinations that will be apparent to one of ordinary skill.

Illustrative System

Figure 2:
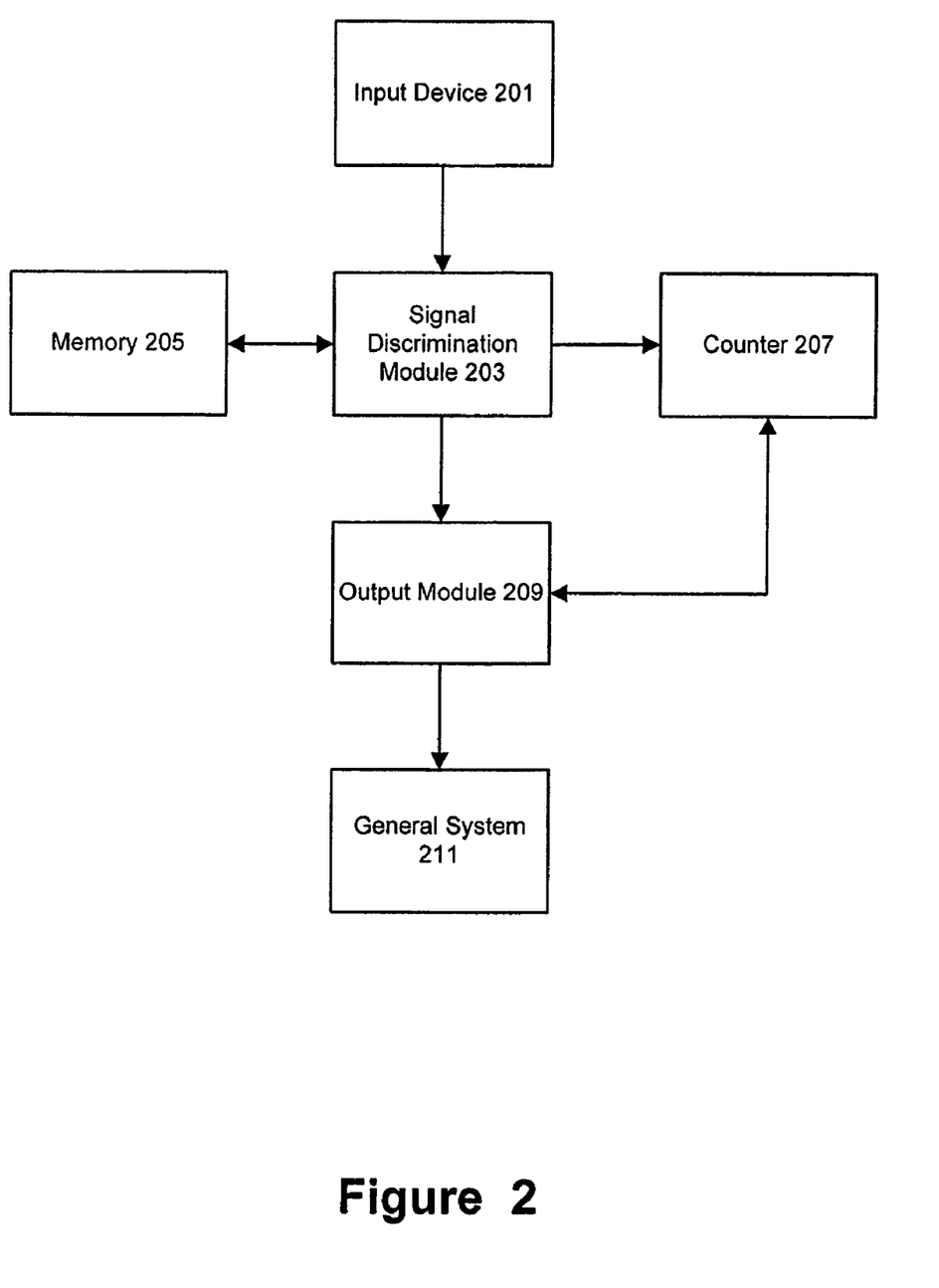
FIG. 2 is a schematic diagram of a system in which various aspects of the invention may be implemented.

With reference to FIG. 2, an illustrative system incorporating aspects of the invention is disclosed. The system includes an input device 201 that may exhibit the configuration of the keyboard 101, the pointing device 102, the stylus 166, or any other input device, whether of conventional or unconventional design. The input device 201 is operatively connected to a signal discrimination module 203 and transmits at least one of a counter signal, a command signal, and a data signal to the signal discrimination module 203. In some aspects of the invention, other input devices may be utilized to transmit one or more of the counter signal, the command signal, and the data signal to the signal discrimination module 203. That is, more than one input device may be utilized to transmit the counter signal, the command signal, and the data signal to the signal discrimination module 203. For example, a first input device may transmit the counter signal, and a second input device may transmit the command signal.

The signal discrimination module 203 receives the signals from the input device 201 and is operatively connected to a memory 205, a counter 207, and an output module 209. The memory 205 may be any type of memory, including the read only memory 140 or the random access memory 150, for example. When the signal discrimination module 203 receives a counter signal from the input device 201, at least a value of the counter signal is stored in the memory 205. Additionally, the signal discrimination module 203 may retrieve data from the memory 205, including the value of the counter signal.

The counter 207 is operatively connected to each of the signal discrimination module 203 and the output module 209. When the signal discrimination module 203 receives a command signal from the input device 201, the counter 207 is incremented by the value of the counter signal that is stored in the memory 205. More particularly, the signal discrimination module retrieves the value of the counter signal from the memory 205 and increments the counter 207 by the value of the counter signal. The counter 207 may be either, an integer counter, a chronographic counter, or both, for example. Accordingly, the value of the counter signal may be either an integer value or a chronographic value.

The output module 209 is operatively connected to each of the signal discrimination module 203, the counter 207, and a general system 211. The signal discrimination module 203 transmits data signals to the output module 209. That is, data signals received from the input device 201 are transmitted to the output module 209. Upon receipt of the data signal, the output module 209 queries the counter 207 to determine a value of the counter 207. If a value of the counter 207 is not greater than zero, then the output module 209 produces an output signal having a first value type to the general system 211. If, however, the value of the counter 207 is greater than zero, then the output module 209 produces an output signal having a second value type to the general system 211. An output signal having the first value type indicates that is system is in a first input mode and may be, for example, a lowercase alphabetic character or movement of the pointer image at a first velocity. Similarly, an output signal having the second value type indicates that the system is in a second input mode and may be, for example, an uppercase alphabetic character, movement of the pointer image at a second velocity, scrolling of a data file rendered on a display screen, or movement of the pointer image between display screens.

The general system 211 may be any remaining portion of the general-purpose digital computing environment embodied above as the computer 100. That is, the output signal from the output module 209 may be transmitted to any relevant portion of the computer 100, such as the monitor 107.

As discussed above, an individual generally activates a series of character keys associated with a keyboard to enter alphabetic characters. In a first input mode, activating the character keys enters a series of lowercase alphabetic characters. In a second input mode, activating the character keys enters a series of uppercase alphabetic characters. This may be accomplished through a conventional method of, for example, activating the "Caps Lock" key to switch from the first input mode to the second input mode. In order to return to the first input mode, the individual again activates the "Caps Lock" key. In this scenario, therefore, the "Caps Lock" key is activated on two occasions to switch between input modes. The system in FIG. 2 reduces the number of steps involved with switching between input modes, as discussed below.

Illustrative Method

An enhanced understanding of the system discussed above may be gained through reference to FIG. 3, which discloses a flow diagram illustrating steps performed in switching between input modes and determining output. To begin the routine, the signal determination module 203 receives a signal (Step 301). The signal may be from the input device 201 or any other source. The signal determination module 203 then determines whether the signal is a counter signal, a command signal, or a data signal (Step 303).

Figure 3:
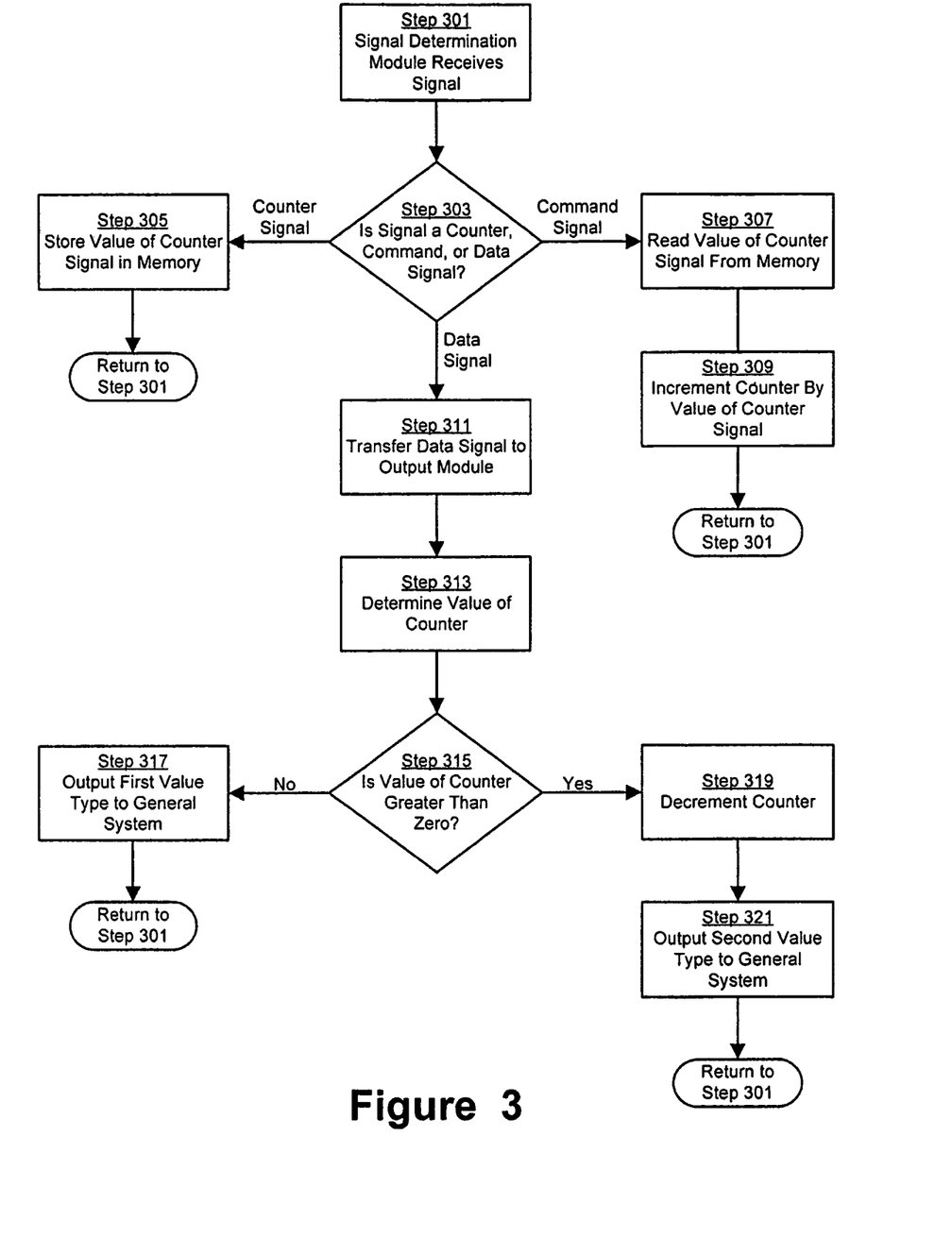
FIG. 3 is a flow diagram illustrating a method of switching modes according to various examples of the invention.

If the signal is a counter signal, then the value of the counter signal is stored in the memory 205 (Step 305). This sets the number of consecutive entries the user desires to input in a second mode. The program then returns to Step 301 to receive another signal.

If the signal is a command signal, however, then the signal determination module 203 reads the value of the counter signal from the memory 205 (Step 307) and increments the counter 207 by the value of the counter signal (Step 309). The program then returns to Step 301 to receive another signal.

If the signal is a data signal, then the data signal is transferred to the output module 209 (Step 311). The output module 209 then determines the value of the counter 207 (Step 313). More particularly, the output module 209 determines whether the value of the counter is greater than zero (Step 315) If the value of the counter 207 is not greater than zero, then the output module 209 outputs a first value type to the general system 211. (Step 317). The program then returns to Step 301 to receive another signal. If, however, the value of the counter 207 is greater than zero, then the output module 209 decrements the counter 207 (Step 319) and outputs a second value type to the general system 211 (Step 321). The program then returns to Step 301 to receive another signal.

As noted above, an output signal having the first value type confirms that is system is in the first input mode and may be, for example, a lowercase alphabetic character or movement of the pointer image at a first velocity. Similarly, an output signal having the second value type confirms that the system is in the second input mode and may be, for example, an uppercase alphabetic character, movement of the pointer image at a second velocity, scrolling of a data file rendered on a display screen, or movement of the pointer image between display screens.

In order to discuss the method in greater detail, an example scenario will be utilized in which the individual determines that two sequential uppercase alphabetic characters are commonly entered with the input device 201 (i.e., a keyboard in this example) in a particular software application. This situation may arise where the individual wants to input the sentence that includes the two-letter initials of various individuals. In other examples, the individual may determine that one, three, four, or more sequential uppercase alphabetic characters are commonly entered. For purposes of explanation, however, assume that two sequential uppercase alphabetic characters are commonly entered with the input device 201 and that is the number the user wants to assign to the counter 207.

A signal is then transmitted to the signal discrimination module 203 (Step 301). More particularly, the input device 201 is then utilized to transmit a counter signal to the signal discrimination module 203. This may be accomplished, for example, through a graphical user interface or other suitable interface. As an alternative, the input device 201 may have a dedicated key that is utilized to input the counter signal, as described in greater detail below. The signal transmitted to the signal discrimination module is then recognized as a counter signal (Step 303) and a value of the counter signal (e.g., two in this example scenario) is stored in the memory 205 (Step 305). The system then returns to Step 301 and waits for the next signal to be input.

Following storage of the value of the counter signal in the memory 205, the individual may proceed to enter text in a conventional manner by activating character keys associated with the input device 201. Activating one of the character keys transmits a data signal to the signal discrimination module 203 (Step 301) and is recognized as a data signal (Step 303). The data signal is then transmitted to the output module 209 (Step 311). Upon receipt of the data signal, the output module 209 queries the counter 207 to determine a value of the counter 207 (Step 313). At this stage, the counter 207 is at a default level of zero as no command signal has been received. Since the value of the counter 207 is not greater than zero, then the output module 209 produces an output signal having a first value type to the general system 211 (Step 317). That is, the output module 209 produces an output signal having a value of a lowercase alphabetic character to the general system 211.

When the individual recognizes that a series of two uppercase alphabetic characters will be entered, the input device 201 is utilized to transmit a command signal to the signal discrimination module 203 (Step 301) and the signal is recognized as a command signal (Step 303). This may be accomplished, for example, by activating a particular, pre-assigned key associated with the input device 201. Upon receipt of the command signal, the signal discrimination module 203 reads or otherwise retrieves the value of the counter signal from the memory 205 (Step 307) and increments the counter 207 by the value of the counter signal (Step 309). In this example, the counter 207 is incremented by two. That is, the counter 207 is incremented from a value of zero to a value of two.

As noted above, the individual may determine that two sequential uppercase alphabetic characters are commonly entered with a keyboard in a particular software application. Following transmission of the command signal, therefore, the individual intends for the two subsequent alphabetic characters that are entered to be uppercase. The individual then activates a character key to transmit a data signal to the signal discrimination module 203 (Step 301), and the signal is recognized as a data signal (Step 303). The data signal is transmitted to the output module 209 (Step 311) and the output module 209 then queries the counter 207 to determine a value of the counter 207 (Step 313). Since the value of the counter 207 is determined to be greater than zero (i.e., the value of the counter 207 is two) (Step 315), then the output module decrements the counter 207 (Step 319) and produces an output signal having a second value type to the general system 211 (Step 321). That is, the output module 209 produces an output signal having a value of an uppercase alphabetic character to the general system 211.

The individual then activates another character key to transmit another data signal to the signal discrimination module 203 (Step 301) and a similar series of events occur. That is, the signal discrimination module recognizes the signal as a data signal (Step 303), the data signal is transmitted to the output module 209 (Step 311), the value of the counter is determined as being one (Step 313), the value of the counter is recognized to be greater than zero (Step 315), the counter 207 is decremented from one to zero (Step 319), and an output signal having a second value type is transmitted to the general system 211 (Step 321). Given that the value of the counter is now zero, subsequent data signals will produce lowercase alphabetic characters until a command signal is received.

Based upon the above discussion, the input device 201 transmits at least a counter signal, a command signal, and a data signal to the signal discrimination module 203. The value of the counter signal remains in the memory 205 until replaced by a superseding counter signal. Data may be input in a conventional manner following transmission of the counter signal. That is, the individual may utilize the character keys to form lowercase alphabetic characters, the individual may utilize the "Shift" key in combination with character keys to form an uppercase alphabetic character, and the individual may utilize the "Caps Lock" key in combination with character keys to form one or more uppercase alphabetic characters. When the individual recognizes, however, that a series of two (utilizing the example outlined above) uppercase alphabetic characters will be input, the individual may activate a key that transmits a command signal to the signal discrimination module 203, and the counter is incremented by the value of the counter signal. Upon activating two subsequent character keys, the output will be uppercase. The counter will then decrement to zero. If further data signals are received, then lowercase alphabetic characters will be output. If a command signal is received, then the counter 207 will increment and the following two data signals will be output as uppercase alphabetic characters. Furthermore, if a new counter signal is received, then the value of the counter signal stored in the memory 205 may be changed.

A similar result may be accomplished, for example, by activating the "Caps Lock" key to switch from the first input mode to the second input mode. In order to return to the first input mode, the individual again activates the "Caps Lock" key. In this scenario, therefore, the "Caps Lock" key is activated on two occasions to switch between the input modes. In the system discussed above, however, the individual need only activate an individual key on one occasion in order to transmit a command signal. Once two subsequent data signals are received and two corresponding uppercase alphabetic characters are produced, the system automatically returns to the first input mode without further keystrokes by the individual. Accordingly, the efficiency with which data is entered may be increased through use of the method discussed above. Additionally, some individuals may only be capable of entering data with one hand, for example, and this method increases the efficiency by which this may be accomplished.

The method discussed above may be applied to other types of data input. With regard to keyboards, for example, the method may be utilized to enter numeric characters in a number pad. Rather than activating the "Number Lock" key to switch from a first input mode to a second input mode (i.e., where numbers are entered) and again activating the "Number Lock" key to switch from the second input mode to the first input mode, a single keystroke may be utilized.

With regard to pointing devices, a first input mode may impart an intermediate velocity to movement of the pointer image on the display screen. In order to increase the velocity of the pointer image, a single key (whether on the keyboard or the pointing device) may be activated so that the following two movements of the pointing device are at the increased velocity. Similarly, the system may be utilized to decrease the velocity of the pointer image, scroll the data file rendered on the display screen, or move the pointer between different display screens in the second mode. Once a prescribed number of actions are taken through the transmission of data signals, then the system will switch back to the first input mode. The system is also applicable to input devices having the configuration of a stylus. Accordingly, the general system discussed above may be applied to a variety of input devices.

The various examples discussed above refer to a first input mode and a second input mode. In some aspects of the invention, more than two input modes may be utilized. With regard to pointing devices, a first input mode may impart an intermediate velocity to movement of the pointer image on the display screen, a second input mode may increase the velocity of the pointer image on the display screen, and a third input mode may decrease the velocity of the pointer image on the display screen. Accordingly, the individual may switch between input modes having an intermediate, fast, or slow velocity for the pointer image. In order to switch between input modes and change the velocity of the pointer image, multiple keys (whether on the keyboard or the pointing device) may be activated. Once a prescribed number of actions are made in the second or third input modes, then the system will switch back to the first input mode. As an alternative, the first input mode may relate to movement of the pointer image, the second input mode may induce scrolling of the image rendered on the display screen, and the third input mode may move the pointer image between multiple display screens. Accordingly, the multiple input modes may have a variety of functions. In addition to pointing devices, multiple input modes may also be utilized with a keyboard, stylus, or other input device.

In the system discussed above, the counter 207 is described as being an integer counter. The counter 207 may also be a chronographic counter. More particularly, the individual may specify a time interval for the second input mode. That is, the counter signal may include a time value that is stored in the memory 205. Once a command signal is received by the signal discrimination module 203, the counter 207 is set to the time value stored in the memory 205 and a countdown occurs. Each data signal received by the system during countdown of the time value is outputted as a second value type (e.g., an uppercase alphabetic character). Following expiration of a time interval equal to the time value, each data signal received by the system is outputted as a first value type (e.g., a lowercase letter).

Illustrative Input Devices

The input device 201 may exhibit the configuration of the keyboard 101, the pointing device 102, the stylus 166, or any other input device, whether of conventional or unconventional design. Accordingly, input device 201 or other input devices utilized in connection with the system and method discussed above may exhibit any conventional or unconventional design. Another aspect of the invention involves an input device incorporating a pressure sensor. An input device 400 is depicted FIG. 4 as a mouse-style pointing device. As is well-known in the art, a purpose of the input device 400 includes moving a pointer image to manipulate virtual objects, such as buttons, icons, hypertext links, or data associated with an image rendered on a display screen. A housing 410 forms an exterior of the input device 400 and has a configuration that interfaces with a hand of the user. A cord 420 extends from a front portion of the housing 410 and is utilized to transmit signals from the input device 400 to the computer 100 and the signal discrimination module 203. Alternately, a conventional wireless connection between the input device 400 and the computer 100 may also be utilized, as is well-known in the art. The signals that are transmitted through the cord 420 are typically generated in response to user manipulation of a primary key 430a, a secondary key 430b, a rotatable wheel 450, and a tracking assembly (not depicted) that senses translational displacement or angular displacement of the input device 400 relative to a support surface upon which the input device 400 rests. The signals may also be generated in response to user manipulation of a pressure sensor 460 that is depicted as being located on a side area of the input device 400, but could be in any location.

Figure 4:
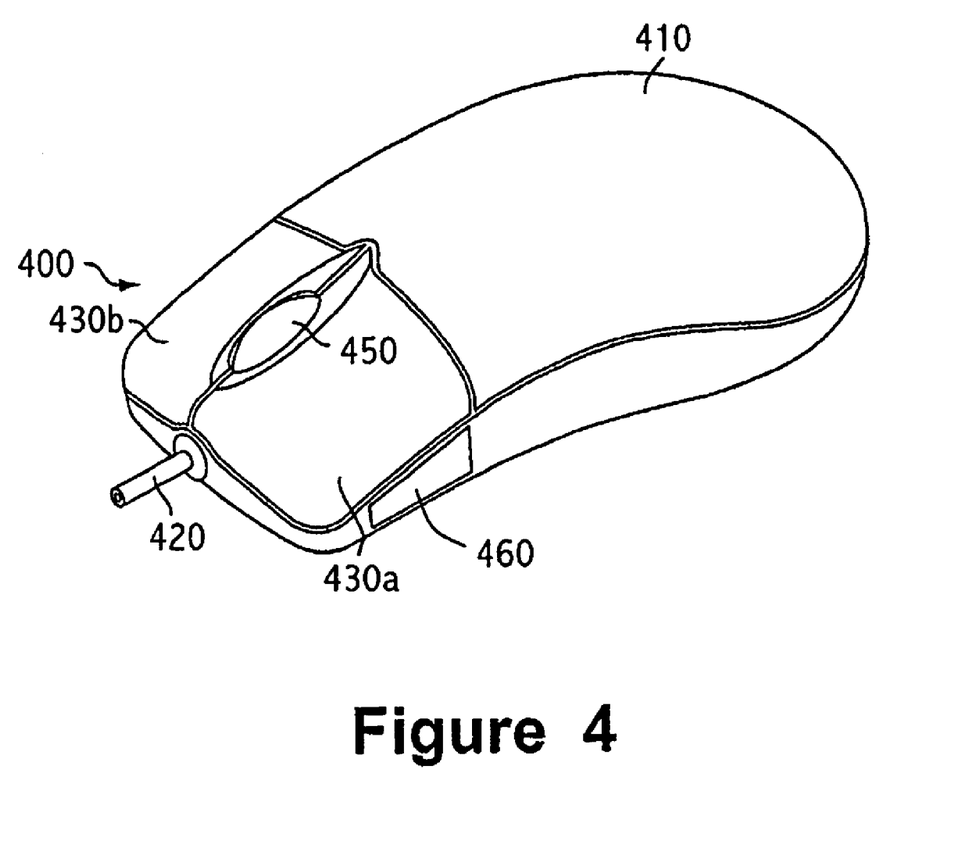
FIG. 4 is a perspective view of a first input device.

The primary key 430a and the secondary key 430b each have a depressible structure and are associated with a pair of switches (not depicted) that are positioned within the housing 410. Accordingly, the primary key 430a may be depressed by the user to activate one of the switches, thereby generating a signal that is transmitted to the computer 100 and the signal discrimination module 203. Similarly, the secondary key 430b may be depressed by the user to activate another of the switches. The switches associated with the keys 430a and 430b generally detect downward movement of the keys 430a and 430b and are either in an on or off state. In contrast with the switches associated with the keys 430a and 430b, the pressure sensor 460 detects the degree of pressure that is placed upon the pressure sensor 460. That is, the value of the signal generated by the pressure sensor 460 is related to the pressure that is placed upon the pressure sensor 460.

As an example, the input device 400 may be utilized in a first input mode to move a pointer image at first velocity, and the input device 400 may be utilized in a second input mode to move the pointer image at a greater second velocity. In the first input mode, the input device 400 is moved relative the support surface so that the tracking assembly senses translational displacement of the input device 400 relative to the support surface. Upon movement of the input device 400, a data signal is transmitted to the signal discrimination module 203, and the data signal is passed to the output module 209. At this stage, the counter is zero (i.e., no command signal was transmitted) and the output module outputs a first value type that induces movement of the pointer image at the first velocity. In the second input mode, the pressure sensor 460 is depressed and the input device 400 is moved relative the support surface so that the tracking assembly senses translational displacement or angular displacement of the input device 400 relative to the support surface. Two signals are, therefore, transmitted to the signal discrimination module. One of the signals is a command signal from the pressure sensor 460 and a second of the signals is a data signal from the tracking assembly. Upon receipt of the command signal, the signal discrimination module increments the counter 207 to a value that is proportional to the degree of pressure upon the pressure sensor 460. Upon receipt of the data signal, the output module 209 determines the value of the counter and increases the velocity of the pointer image in proportion to the value of the counter. That is, the velocity of the pointer image is proportional to the degree of pressure that is placed upon the pressure sensor 460. Accordingly, the general system and method described above may be utilized in combination with an input device that incorporates a pressure sensor.

Increasing the velocity of the pointer image is only an example of the actions that may occur in the second input mode. As an alternative, the velocity of the pointer image may be decreased in proportion to the degree of pressure upon the pressure sensor 460. The second input mode may also cause the data file rendered on the display screen to scroll in proportion to the degree of pressure upon the pressure sensor 460. Accordingly, a variety of actions may occur in the second input mode that are related to the degree of pressure upon the pressure sensor 460.

When a hand rests upon the input device 400, a portion of the hand may rest upon or inadvertently contact the pressure sensor 460. In order to prevent inadvertent switching from the first input mode to the second input mode, the system may require that a threshold degree of pressure upon the pressure sensor 460 be exceeded prior to switching. That is, the system may be configured such that no switching from the first input mode to the second input mode occurs when the degree of pressure upon the pressure sensor is less than a pre-determined value. Once the degree of pressure upon the pressure sensor exceeds the pre-determined value, however, switching to the second input mode may occur.

Figure 5:
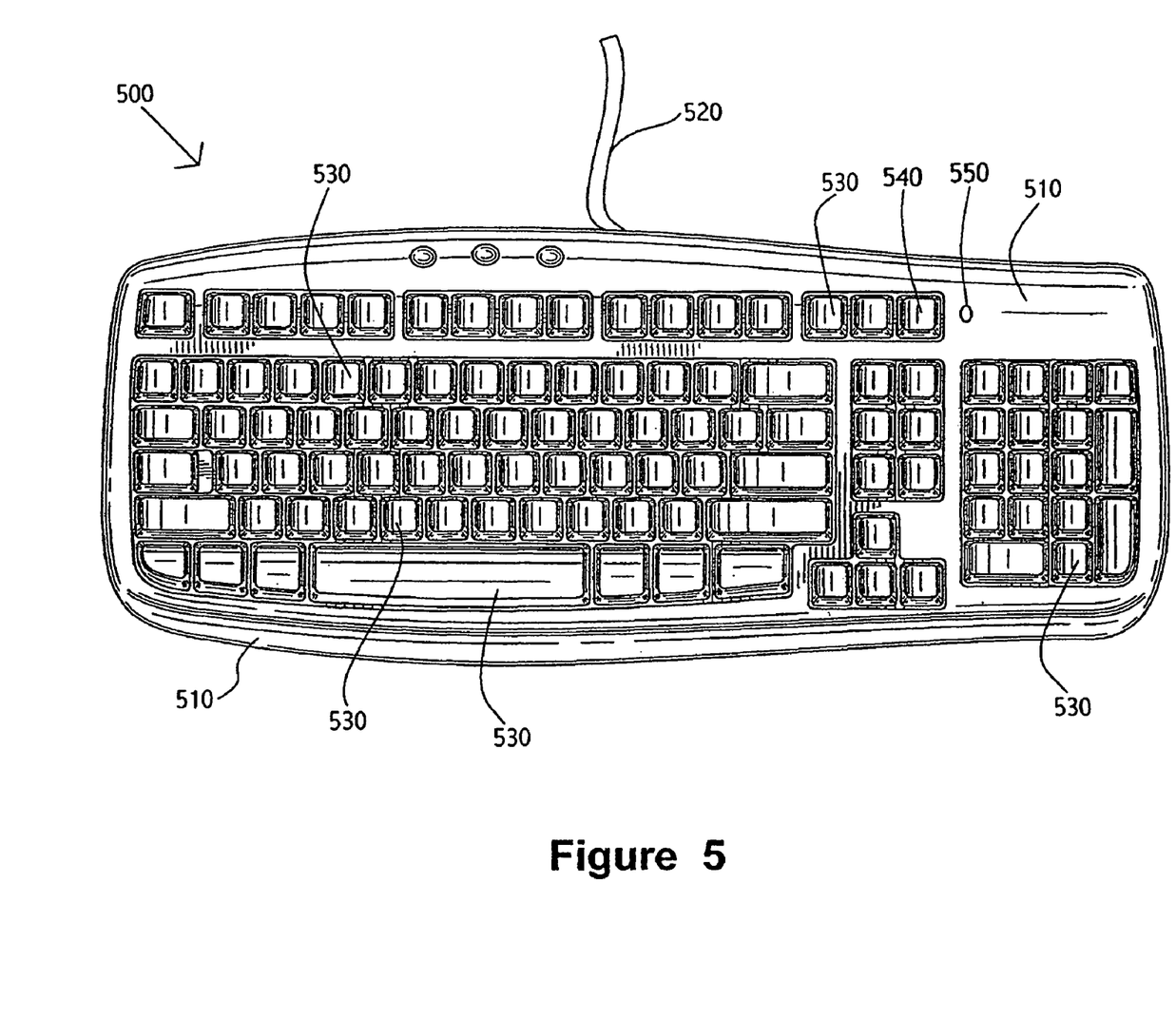
FIG. 5 is a top plan view of a second input device.

Another input device 500 is depicted FIG. 5 as a keyboard. As is well-known in the art, one purpose of the input device 500 is to enter characters. A housing 510 forms an exterior of the input device 500 and has a configuration that rests upon a support surface. A cord 520 extends from a front portion of the housing 510 and is utilized to transmit signals from the input device 400 to the computer 100 and the signal discrimination module 203. Alternately, a conventional wireless connection between the input device 500 and the computer 100 may also be utilized, as is well-known in the art. The signals that are transmitted through the cord 520 are typically generated in response to user manipulation of a variety of keys 530.

The keys 530 may be utilized for a variety of purposes. For example, some of the keys 530 enter alphabetic characters, and other ones of the keys 530 enter numeric characters. As is known in the art, some of the keys 530 may also enter combinations of numeric and symbolic characters, for example, and other ones of the keys 530 may be considered function keys. With regard to the keys 530 that enter alphabetic characters, one manner of switching from the first input mode (wherein lowercase alphabetic characters are entered) to the second input mode (wherein uppercase alphabetic characters are entered) involves activating and holding a "Shift" key while one or more of the keys 530 are activated. Following entry of an uppercase alphabetic character, the individual releases the "Shift" key to return to the first input mode and enter additional lowercase alphabetic characters.

The input device 500 provides an alternate method of switching between the first input mode and the second input mode. One or more of the keys 530 activate a pressure sensor that detects the degree of pressure upon the keys 530. In order to input a lower case alphabetic character, for example, the individual may depress one of the keys 530 with a relatively light degree of pressure. If the pressure upon the one of the keys 530 exceeds a threshold pressure, however, an uppercase alphabetic character is entered. That is, the degree of pressure upon one of the keys 530 determines whether a lowercase alphabetic character or an uppercase alphabetic character is entered.

Similar concepts may be utilized for the keys 530 that enter either a numeric character or a symbolic character. When the degree of pressure upon one of these keys 530 is below a threshold, a numeric character is entered. When the degree of pressure upon one of these keys 530 is above the threshold, however, a symbolic character is entered. Accordingly, a pressure sensor associated with the keys 530 may be utilized to input characters in the first input mode or the second input mode.

The degree of pressure may also relate to the rate at which signals are sent to the computer 100. For example, holding one of the keys 530 in a depressed state will generally cause a series of the characters to be generated. When a pressure sensor is utilized, however, the rate at which the characters are generated may be proportional to the pressure upon the key 530. For example, relatively low pressures may generate characters at a lesser rate than relatively high pressures.

In the above examples, pressure sensors effectively provide the command signals associated with switching between input modes. The pressure sensors may also provide the data signals. In other aspects of the invention, two different input devices may provide the command signals and the data signals. For example, data signals may be transmitted by a microphone and command signals may be transmitted by an iris sensor. As long as the eye of the individual is directed toward a display screen, inputs from the microphone are recorded. Once the eye looks away from the display screen, however, the iris sensor transmits a command signal that directs the computer 100 to cease recording speech through the microphone. Various other types of sensors may also be utilized within the scope of the invention, including proximity sensors, capacitive sensors, and temperature sensors, for example. Accordingly, mode switching may be accomplished through the application of a variety of sensor types.

The input device 500 provides yet another method of switching between the first input mode and the second input mode. More particularly, the input device 500 includes a command key 540 and an associated indicator 550. Depressing the command key 540 transmits the command signal to the signal discrimination module 203. Subsequent activations of the various keys 530, which may or may not be associated with a pressure sensor, inputs data in the second input mode until the predetermined number of entries are completed, as determined by the counter signal.

The command key 540 may also provide an expedient method of transmitting the counter signal, thereby setting the number of data entries that will be in the second input mode upon transmission of a command signal. More particularly, the individual may depress and hold the command key for a prescribed period of time and then enter a numeric value with the various keys 530. The numeric value may be utilized to replace the previously-stored value of the counter signal with a new value of the counter signal. Accordingly, the command key may be utilized for transmitting both a command signal and a counter signal.

The indicator 550, which may be a light emitting diode, is positioned adjacent the command key 540 and may illuminate, for example, to indicate that data will be entered in the second input mode. When the predetermined number of entries in the second input mode are completed, the system returns to the first input mode and the indicator 550 will cease being illuminated. An advantage to the indicator 550 is that the individual gains a visual indication on whether the system is in the first input mode or the second input mode.

The system and method discussed above may be implemented through software. That is, software may be utilized for each of the signal discrimination module 203, the counter 207, and the output module 209, for example. In further aspects of the invention, each of the signal discrimination module 203, the counter 207, and the output module 209, for example, may be implemented through hardware. As an example, hardware within the input device 201, the input device 400, or the input device 500 may determine whether the input device 201 transmits a signal having the first value type or the second value type. Accordingly, the manner in which aspects of the invention are implemented may vary significantly.

The invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the invention, as defined by the appended claims.

That which is claimed is:

1. A method of producing an output signal having a first value type or a second value type, comprising:
   receiving an input signal from an input device;
   storing a first numeric value in a counter if the input signal is a counter signal;
   incrementing the counter by a second numeric value if the input signal is a command signal; and
   if the input signal is a data signal, then producing an output signal having the first value type when a value of the counter is not greater than zero or producing an output signal having the second value type when the value of the counter is greater than zero.

2. The method recited in claim 1, wherein the counter is an integer counter.

3. The method recited in claim 2, further including a step of decrementing the value of the counter when the input signal is the data signal and the counter is greater than zero.

4. The method recited in claim 1, wherein the counter is a chronographic counter.

5. The method recited in claim 1, wherein the input device is a keyboard and the data signal is a character, the first value type of the output signal being a non-capitalization of the character, and the second value type of the output signal being a capitalization of the character.

6. The method recited in claim 1, wherein the input device is a pointing device that controls a pointer on a display screen, the first value type of the output signal directing movement of the pointer at a first velocity on the display screen, and the second value type of the output signal directing movement of the pointer at a second velocity on the display screen.

7. A computer readable medium having computer-executable instructions, which when executed by a processor, perform the method of:
   receiving an input signal from an input device;
   storing a first numeric value in a counter if the input signal is a counter signal;
   incrementing the counter by a second numeric value if the input signal is a command signal; and
   if the input signal is a data signal, then producing an output signal having the first value type when a value of the counter is not greater than zero or producing an output signal having the second value type when the value of the counter is greater than zero.

8. The computer readable medium recited in claim 7, wherein the counter is an integer counter.

9. The computer readable medium recited in claim 8, further including a step of decrementing the value of the counter when the input signal is the data signal and the counter is greater than zero.

10. The computer readable medium recited in claim 7, wherein the counter is a chronographic counter.

11. The computer readable medium recited in claim 7, wherein the input device is a keyboard and the data signal is a character, the first value type of the output signal being a non- capitalization of the character, and the second value type of the output signal being a capitalization of the character.

12. The computer readable medium recited in claim 1, wherein the input device is a pointing device that controls a pointer on a display screen, the first value type of the output signal directing movement of the pointer at a first velocity on the display screen, and the second value type of the output signal directing movement of the pointer at a second velocity on the display screen.

13. An input device comprising:
a plurality of data keys for generating a data input signal;
a command key for generating a numerical input signal; and
a processor for increasing a value of a counter in response to the numerical input signal and wherein the processor produces an output signal having a first value type upon receiving the data input signal when the counter is greater than zero and produces an output signal having a second value type when the counter is not greater than zero.

14. The input device recited in claim 13, wherein the predetermined number of output signals is greater than one.

15. The input device recited in claim 13, wherein the input device is a keyboard.

16. The input device recited in claim 15, wherein the input device includes an indicator.

17. The input device recited in claim 16, wherein the indicator illuminates when the value of the counter is greater than zero.

18. The input device recited in claim 16, wherein the indicator is positioned adjacent the command key.

19. The input device recited in claim 15, wherein the first value type of the output signal is a non-capitalization of a character, and the second value type of the output signal is a capitalization of the character.

* * * * *